US012054408B2

United States Patent
Lunde et al.

(10) Patent No.: US 12,054,408 B2
(45) Date of Patent: Aug. 6, 2024

(54) SYSTEM AND METHOD FOR DISINFECTING AND REMOVING BIOLOGICAL MATERIAL FROM WATER TO BE INJECTED IN AN UNDERWATER INJECTION WELL

(71) Applicant: Grant Prideco, Inc., Houston, TX (US)

(72) Inventors: Helge Lunde, Sandnes (NO); David Pinchin, Hundvag (NO)

(73) Assignee: GRANT PRIDECO, INC., Houston, TX (US)

( * ) Notice: Subject to any disclaimer, the term of this patent is extended or adjusted under 35 U.S.C. 154(b) by 146 days.

(21) Appl. No.: 17/115,542

(22) Filed: Dec. 8, 2020

(65) Prior Publication Data

US 2021/0087080 A1    Mar. 25, 2021

Related U.S. Application Data

(63) Continuation of application No. 14/768,731, filed as application No. PCT/NO2014/050021 on Feb. 11, 2014, now abandoned.

(30) Foreign Application Priority Data

Feb. 18, 2013 (NO) .................................. 20130267

(51) Int. Cl.
*C02F 1/52* (2023.01)
*C02F 1/44* (2023.01)
(Continued)

(52) U.S. Cl.
CPC .......... *C02F 1/4674* (2013.01); *C02F 1/5281* (2013.01); *C02F 1/004* (2013.01);
(Continued)

(58) Field of Classification Search
CPC .......... C02F 1/004; C02F 1/44; C02F 1/4674; C02F 1/5281; C02F 1/72; C02F 2001/007;
(Continued)

(56) References Cited

U.S. PATENT DOCUMENTS 6,207,059 B1  3/2001  Moore, III
7,476,324 B2  1/2009  Ciampi et al.
(Continued)

FOREIGN PATENT DOCUMENTS

CN   101134626 A    3/2008
CN   102701346 A   10/2012
(Continued)

OTHER PUBLICATIONS

Texas AgriLife Extension Service, Texas A & M (Year: 2009).*
(Continued)

*Primary Examiner* — Patrick Orme
(74) *Attorney, Agent, or Firm* — CONLEY ROSE, P.C.

(57) ABSTRACT

A system for disinfecting and removing biological material from water to be injected into an injection well in a water body is described; the system includes: at least one apparatus for the gravitational precipitation of particles from water, which is connected, in terms of fluid, to a source of untreated water and to the injection well; and an apparatus for the addition of an oxidant for the disinfection of water, which is connected in terms of fluid to the apparatus for the gravitational precipitation of particles, a source of untreated water and to the injection well such that the apparatus for the gravitational precipitation of particles is positioned downstream relative to the apparatus for the addition of an oxidant for disinfection. The disclosure also relates to a method for disinfecting and removal of biological material from injection water.

16 Claims, 5 Drawing Sheets

Figure 1:
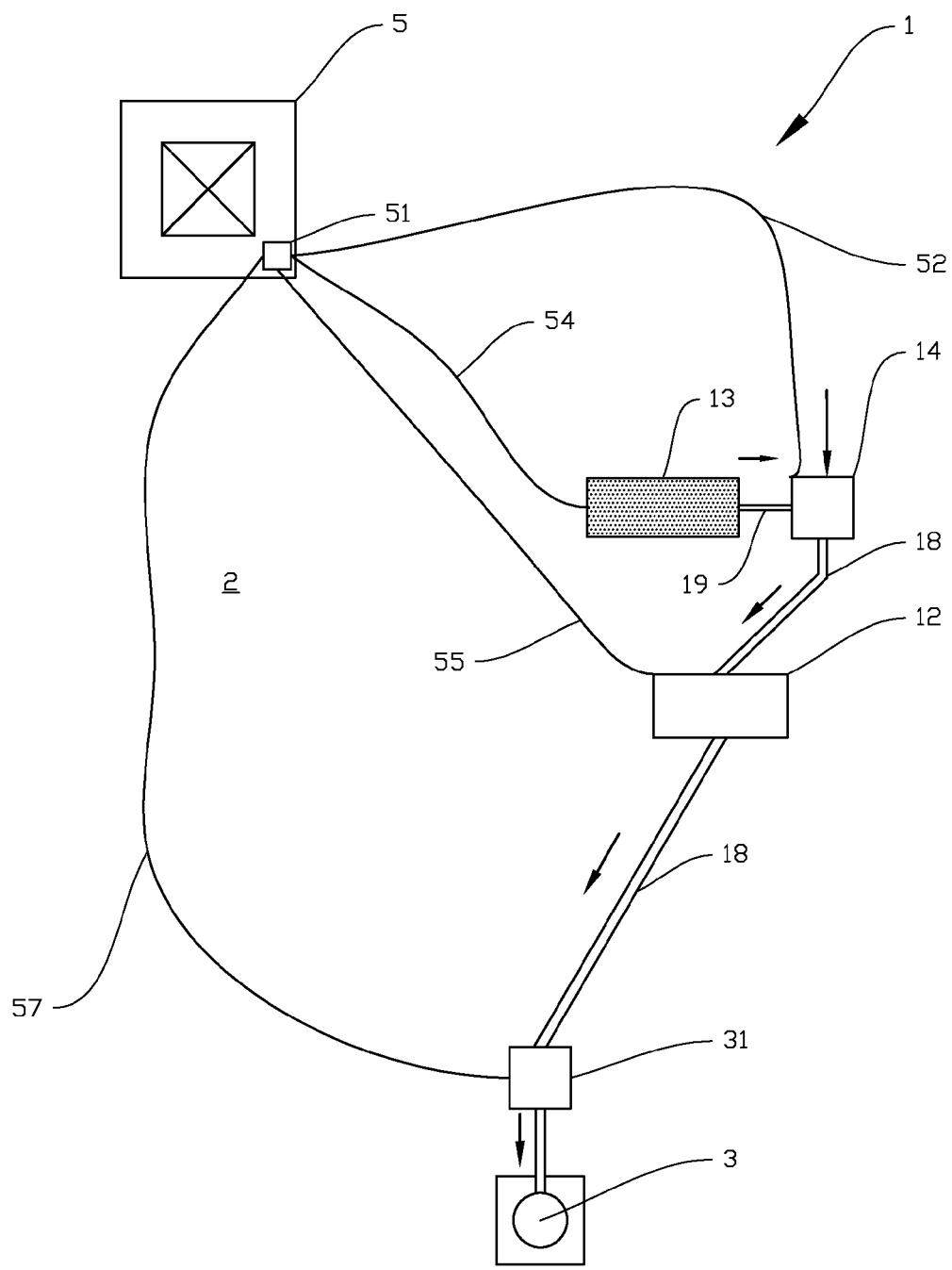
Figure 1:
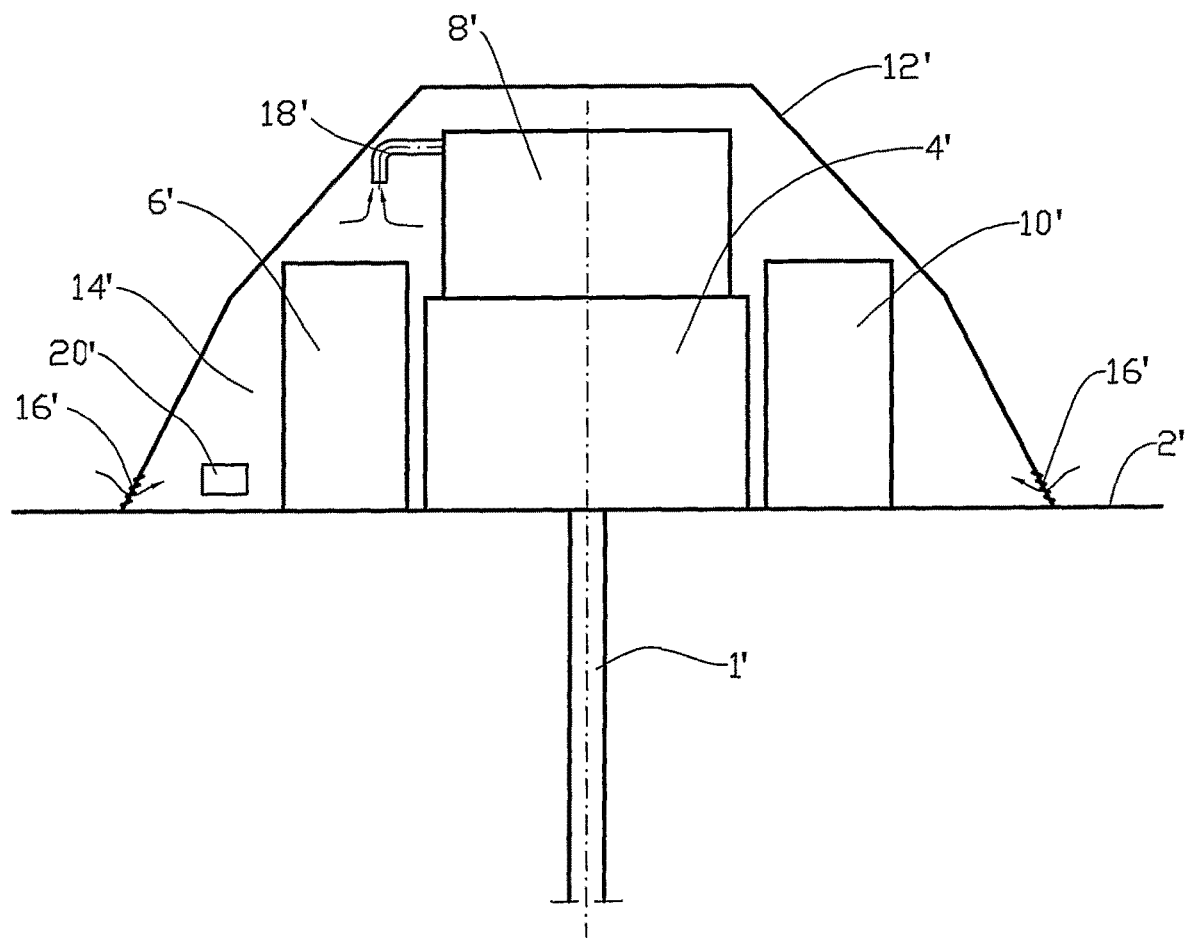

(51) Int. Cl.
  *C02F 1/467* (2023.01)
  *C02F 1/72* (2023.01)
  *C02F 103/08* (2006.01)
  *C02F 103/10* (2006.01)
  *C02F 1/00* (2023.01)
  *C02F 101/30* (2006.01)

(52) U.S. Cl.
  CPC .......... *C02F 2001/007* (2013.01); *C02F 1/44* (2013.01); *C02F 1/72* (2013.01); *C02F 2101/30* (2013.01); *C02F 2103/08* (2013.01); *C02F 2103/10* (2013.01); *C02F 2209/005* (2013.01); *C02F 2209/29* (2013.01); *C02F 2303/04* (2013.01)

(58) Field of Classification Search
  CPC .............. C02F 2101/30; C02F 2103/08; C02F 2103/10; C02F 2209/005; C02F 2209/29; C02F 2303/04
  See application file for complete search history.

(56) References Cited

U.S. PATENT DOCUMENTS

| | | |
|---|---|---|
| 2006/0243670 A1 | 11/2006 | Pinchin |
| 2008/0257550 A1 | 10/2008 | Pinchin |
| 2009/0301717 A1 | 12/2009 | Lunde et al. |

FOREIGN PATENT DOCUMENTS

| | | | |
|---|---|---|---|
| GB | 2246123 A | 1/1992 | |
| JP | 2006248510 A | 9/2006 | |
| JP | 2011092898 A | 5/2011 | |
| WO | 2004/090284 A1 | 10/2004 | |
| WO | 2007/035106 A1 | 3/2007 | |
| WO | 2007/035107 A1 | 3/2007 | |
| WO | 2007/073198 A1 | 6/2007 | |
| WO | WO-2007073198 A1 * | 6/2007 | ............ C02F 1/4674 |
| WO | 2012/026827 A1 | 3/2012 | |
| WO | 2012/087149 A1 | 6/2012 | |

OTHER PUBLICATIONS

Oxidizing and non-oxidizing biocides—Alvim (Year: 2023).*
Magnet Media: Rensing av drikkevann, Valg for Fremtiden, Sep. 19, 2013 (http://digi.magnetmedia.no/valg-for-fremtiden/m-1 /artikler/rensing-av-driklceva).
Written Opinion dated May 30, 2014 for PCT/NO2014/050021 (5 pages).
International Search Report dated May 30, 2014 for PCT/NO2014/050021 (6 pages).

* cited by examiner

SYSTEM AND METHOD FOR DISINFECTING AND REMOVING BIOLOGICAL MATERIAL FROM WATER TO BE INJECTED IN AN UNDERWATER INJECTION WELL

CROSS-REFERENCE TO RELATED APPLICATIONS

The present application is a continuation of U.S. patent application Ser. No. 14/768,731, filed Aug. 18, 2015, and entitled "System and Method for Disinfecting and Removing Biological Material from Water to be Injected in an Underwater Injection Well," which is the U.S. National Stage entry under 35 U.S.C. § 371 of International Patent Application No. PCT/NO2014/050021, filed Feb. 11, 2014, and entitled "System and Method for Disinfecting and Removing Biological Material from Water to be Injected in an Underwater Injection Well," which claims priority to Norwegian Patent Application No. NO20130267, filed Feb. 18, 2013, all of which are hereby incorporated by reference in their entireties for all purposes.

BACKGROUND

The present disclosure relates to a device for disinfecting and removing biological material from a water flow. More specifically, the disclosure relates to a system for disinfecting and removing biological material from water to be injected into an underwater injection well, the system including at least one apparatus for the gravitational precipitation of particles from the water and at least one apparatus for adding an oxidant to the water, the two apparatuses being connected in terms of fluid, and the two apparatuses connecting a source of untreated water to an injection well in terms of fluid. The disclosure also relates to a method for disinfecting and removing biological material from a water flow.

It is known to inject water into a petroleum reservoir to increase the production rate and the amount of recoverable reserves of the petroleum reservoir. The injection water is carried into the reservoir at a pressure which is higher than the in-situ pressure of the reservoir to expel further hydrocarbons therefrom. Water for injection is usually taken from the nearest accessible water source, generally sea water. Sea water contains, inter alia, salts, biological and organic material and other particles which are undesired in the reservoir and in the injection well with associated equipment. The biological material may include various types of plankton, bacteria and the like, which may have an adverse effect on the well downstream of the point of introduction as it may lead to biological fouling, deposits and/or blocking of equipment in the well. Biological material may also lead to acidification of the reservoir as sulphate-reducing bacteria may provide good conditions for the generation of hydrogen sulphide ($H_2S$). $H_2S$ gas is very toxic and will lead to considerable challenges for the operation of the system by a break-through into the production well. The $H_2S$ gas may also lead to corrosion on equipment in the well and in the processing plant for treating produced hydrocarbons.

From the patent publication WO 2007/035106 A1, an apparatus and a method for the non-mechanical separation of particles from a flow of water are known, the water being carried into a closed space in which the water flow rate is made sufficiently low for undesired particles to be gravitationally precipitated from the water flow.

It is advantageous that, while within the space, the injection water is led to flow from a lower level of height to a higher level of height.

The space, which may with advantage be located on the seabed, is typically provided with inflow openings at its lower portion. Alternatively, an inflow pipe may carry the water to be treated to the lower portion of the space.

The water then flows at a relatively low rate upwards from the lower portion of the space, the flow rate being so low that the undesired particles precipitate from the water. To describe theoretically a process of precipitation of a material in a fluid, it is common to take as a basis the generally known Stoke's law:

$$V_t = \frac{g \cdot D^2 \cdot (\rho_1 - \rho_2)}{18 \cdot \mu} \left[\frac{m}{s}\right]$$

For particles in water $V_t$ is the rate of precipitation of a particle in the water, g is gravitation, D is particle diameter, $\rho_1$ is the specific gravity of a continuous phase (water), $\rho_2$ is the specific gravity of the particle, and $\mu$ is the viscosity of the continuous phase.

Thus, when the largest acceptable diameter and specific weight of particles that may be entrained in the injection water to the petroleum reservoir, have been determined, it is relatively easy to determine the rate of precipitation of the smallest particles that have to be precipitated. The climbing speed within the space must be lower than the rate of precipitation of the smallest particles that have to be precipitated.

In a practical embodiment the space may be constituted by a superstructure enclosing a wellhead on the seabed. Besides well head valves there may be, in the space, apparatuses for further treatment of the injection water and also pumps and other equipment in accordance with the prior art known per se. The space may possibly be formed by a separate structure arranged for the purpose.

It is advantageous that the injection water is taken from the space at the upper portion of the space, from where the injection water is typically carried to subsequent further treatment.

The use of the disclosed method essentially renders filtration of injection water superfluous. This enables a significant simplification of the injection water treatment plants, which is particularly advantageous when such plants are located on the seabed.

From the patent publication WO 2004/090284 A1, a device and a method for the chemical treatment of injection water are known. The injection water flows through a container containing chemicals in particle, pellet or block form, whereby the chemicals are dosed gradually into the injection water. It is described that the chemical may include at least one of chlorine, biocide, polyelectrolytes, ferric chloride, deoxidizer, corrosion inhibitor and scale inhibitor.

The patent publication WO 2007/073198 discloses a method and an apparatus for the destruction of organic material in water to be injected into an injection well. The apparatus includes, among other things, an electrolytic cell with associated operational means for the in-situ production of short-lived, free hydroxyl radicals ($\cdot$OH).

In sum, the above-mentioned patent publications (each of which are incorporated herein in their entireties by reference) describe techniques enabling the cleaning of injection water on a sea floor, wherein undesired particles are disinfected and/or removed from sea water, and wherein cleaned sea water is subsequently used as injection water in an injection well completed on the sea floor. Certain advantages of being able to position a treatment system for injection water on a sea floor are described in the above-mentioned patent publications and include, among other things, a reduced need for space, increased flexibility, reduced need for energy supply and reduced costs.

The apparatus and the method for the gravitational precipitation of particles disclosed in the above-mentioned patent publication WO 2007/035106 A1 are used today for removing inorganic particles from the injection water, usually as a first step in a cleaning process. A drawback of this arrangement is that some biologic material has a specific gravity that is low and maybe of the same order as the specific gravity of water, so that the biological material will not be precipitated in the gravitational filtering.

BRIEF SUMMARY OF THE DISCLOSURE

In a first aspect, the disclosure relates to a system for disinfecting and removing biological material from water to be injected into an injection well in a water body, the system comprises: at least one apparatus for the gravitational precipitation of particles from water, the at least one apparatus for the gravitational precipitation of particles being connected, in terms of fluid, to a source of untreated water and to the injection well; and at least one apparatus for the addition of an oxidant for the disinfection of water, the at least one apparatus for the addition of an oxidant being connected, in terms of fluid, to the at least one apparatus for the gravitational precipitation of particles, the source of untreated water and to the injection well, wherein the at least one apparatus for the gravitational precipitation of particles being positioned downstream relative to the apparatus for the addition of an oxidant for disinfection.

The oxidant may be selected from a group consisting of chlorine, dioxygen, ozone, hydrogen peroxide, hypochlorite, chlorine dioxide and other oxidizing biocides, but the disclosure is not limited thereto.

The oxidant may be added from a solid, semisolid or liquid state or the oxidant may be produced electrolytically.

Tests performed and described herein have shown that the addition of an oxidant to the injection water affects the cell structure of biological material in such a way that the cell structure decomposes and the specific gravity of the biological material increases. The gravitational precipitation of biological particles which have a specific gravity that makes such precipitation difficult or impossible thus becomes far more effective. A further embodiment therefore provides a method of performing gravitational filtration of biological material comprising: injecting water comprising chlorine into an injection well; increasing a specific gravity of the biological material present in the body of water injected into said well; and filtering the biological material from the water comprising said well.

In what follows, the apparatus for adding an oxidant to the injection water will be exemplified by an apparatus for adding chlorine to the injection water, but it is to be understood that the disclosure is not limited thereto.

In one embodiment, the apparatus for adding chlorine may include a container for the addition of chlorine from a solid or semisolid state to the injection water. For example, it may be in block, powder or gel form. The water is carried through the container in such a way that it gets into contact with chlorine in solid or semisolid from, whereby chlorine is dosed gradually into the injection water.

In one embodiment, the water may be circulated in a circulation circuit until the water has picked up a desired concentration of chlorine as described in the Norwegian patent NO 324547 (which is incorporated herein in its entirety by reference).

In one embodiment, the at least one apparatus for the addition of chlorine may include a device for the electrolytic production of chlorine. Chlorine may be produced by the electrolysis of sea water and the apparatus may be an electrolytic cell of a type known per se.

In one embodiment, the at least one apparatus for the addition of chlorine may include a container for the addition of chlorine from a liquid state. This may be done, for example, by means of a refillable, flexible volumetric storage unit, wherein such containers are described in the Norwegian patent NO 331478 (which is also incorporated herein in its entirety by reference).

A further advantage of dosing chlorine into the injection water upstream of the apparatus for the gravitational precipitation of particles is that the chlorine will have a long detention time in the apparatus for the gravitational precipitation of particles, and that the chlorine will thereby have sufficient time to complete its reaction with biological material in the injection water. In some embodiments, the detention time of the injection water in the apparatus for the gravitational precipitation of particles may be several minutes and even several hours. The long detention time is distinctive from that of the prior-art water-treatment plants in which the chlorine has a reaction time which is often less than one minute. By monitoring the amount of chlorine at the outlet of the apparatus for the gravitational precipitation of particles and controlling the dosing rate of chlorine, it may be ensured that all the chlorine will be reacted completely in the apparatus for the gravitational precipitation of particles.

In one embodiment, the system may include an apparatus provided with a filtering membrane for filtering the injection water downstream of the chlorine addition. Said filtering membrane may, among other things, remove various particles of salts and minerals left in the injection water. Chlorine is known to be harmful to filtering membranes, and when such membranes are used, the use of chlorine as a disinfectant upstream of the membranes has been prevented till now. The filtering membrane may, for example, be of a type as described in the Norwegian patent application NO 20101192 (which is incorporated herein in its entirety by reference).

In addition, the system may include a device for the electrolytic production of free hydroxyl radicals, wherein the device for the electrolytic production of free hydroxyl radicals may be connected, in terms of fluid, to the apparatuses for the gravitational precipitation of particles and addition of chlorine, to the source of untreated water and to the injection well. Short-lived, free hydroxyl radicals are very effective for removing organic material in a water flow. The device for the electrolytic production of free hydroxyl radicals could thereby help to further clean the injection water before injection into the injection well. The device for the electrolytic production of free hydroxyl radicals may be placed downstream relative to the apparatus for the gravitational precipitation of particles.

In addition or as an alternative to the device for the electrolytic production of free hydroxyl radicals, the system may include a device for the electrolytic production of mixed oxidants. Mixed oxidants may be produced by the electrolysis of sea water, and the device may be of a kind known per se. It has been shown that mixed oxidants are very well suited for inactivating various micro-organisms.

In a second aspect, the disclosure relates to a method for disinfecting and removing biological material from water to be injected into an injection well in a water body, the method including the following steps: by means of at least one apparatus for the disinfection of water, adding an oxidant to the injection water; by means of at least one apparatus for the gravitational precipitation of particles from water, removing particles from the injection water; in terms of fluid, connecting the apparatuses for the gravitational precipitation of particles and the addition of an oxidant, to a source of untreated water and to the injection well, characterized by the method including placing the apparatus for the gravitational precipitation of particles in water downstream relative to the apparatus for the chemical disinfection of water.

In what follows, the step of adding an oxidant to the injection water will be exemplified by adding chlorine to the injection water, even though the disclosure is not limited thereto.

In one embodiment, the step of adding chlorine to the injection water may include adding chlorine from a solid or semisolid state.

In one embodiment, the step of adding chlorine to the injection water may include producing chlorine by means of an electrolytic cell.

In one embodiment, the step of adding chlorine to the injection water may include adding chlorine from a liquid state.

The method may further include providing the system with a device for the electrolytic production of free hydroxyl radicals, and, in terms of fluid, connecting the device for the production of free hydroxyl radicals to the apparatuses for the addition of chlorine and gravitational precipitation of particles, to the source of untreated water and to the injection well.

The method may further include providing the system with a device for the electrolytic production of mixed oxidants and, in terms of fluid, connecting the device for the production of mixed oxidants to the apparatuses for the addition of chlorine and gravitational precipitation of particles, to the source of untreated water and to the injection well.

The method may further include filtering the injection water by means of an apparatus provided with a filtering membrane downstream relative to the apparatus for the gravitational precipitation of particles, and thus also downstream relative to the apparatus for adding chlorine to the injection water.

In a third aspect, the disclosure relates to the use of chlorine to increase the specific gravity of biological material in water to be injected into an injection well in a water body.

BRIEF DESCRIPTION OF THE DRAWINGS

In what follows, exemplary embodiments are described with reference to the accompanying drawings, in which:

FIG. 1 shows a first embodiment of the present disclosure, viewed from above; FIG. 1' shows schematically and in section a closed space with arrows indicating the flow of the water;

FIG. 2 shows a second embodiment of the present disclosure, viewed from above;

FIG. 3 shows a third embodiment of the present disclosure, viewed from above; and FIG. 4 shows a fourth embodiment of the present disclosure, viewed from above;

The figures are shown in a schematic and simplified manner and elements which are not central to the disclosure and/or elements that, to a person skilled in the art, will be known parts of the system may have been omitted from the figures for clarity and conciseness. In the figures, the direction of the water flow is indicated by straight arrows.

DETAILED DESCRIPTION OF EXEMPLARY EMBODIMENTS

FIG. 1' shows schematically and in section a closed space with arrows indicating the flow of the water. In FIG. 1', the reference numeral 1' identifies a pipe connection extending from the seabed 2' down to a petroleum reservoir, not shown, in the ground. A wellhead 4' is placed on the seabed 2' and is connected to the pipe connection 1'. Surrounding the wellhead 4', and above it, are arranged at least one water treatment apparatus 6', a pump module 8' and an energy and control module 10'. Other necessary equipment packages, not shown, in accordance with the prior art known per se are also placed at the wellhead 4'. Said apparatuses and modules 4' to 10' and also equipment packages, not shown, are surrounded by plate-shaped covers 12' forming together with the seabed 2' a closed space 14'. The covers 12' may include hatches, not shown, for access to the space 14'. At the lower portion of the space 14' are arranged openings 16' where untreated water from the surroundings may enter. The water then flows upwards in the space 14' at a flow rate, which, because of the cross-sectional area of the space, is lower than the rate of precipitation of the smallest particle which is desirably to be precipitated from the water. The particles in the water are not shown in the figure. The precipitated particles, not shown, settle on the seabed 2' and on apparatus parts 4', 8', 10', from which, if necessary, they may be flushed away whenever necessary. After the water has flown upwards to the upper portion of the space 14' and has become essentially free of undesired particles, the water enters the inlet opening of a pump pipe 18', from where the water flows via the pump module 8' and water treatment apparatus 6' through the pipe connection 1' to the petroleum reservoir, not shown. In the space 14' there is placed copper 20' or other organism repellent or toxic material, for example in the form, of a copper-containing material which is in contact with at least part of the water flowing through the space 14'. The purpose of the copper 20' is to make the space less attractive to living organisms. In a further exemplary embodiment, not shown, a channel for the inflow of water into the space 14' may open into the lower portion of the space 14'.

In what follows, the reference numeral 1 indicates a system in accordance with the present disclosure.

FIG. 1 shows a first embodiment of the present disclosure, viewed from above. The system 1 is placed on a sea floor in a water body 2 in the vicinity of a platform 5. Untreated sea water is guided into a water-intake device 14, the water-intake device 14 being connected to a coupling device 51 on the platform 5 via a control cable 52. The control cable 52 delivers electric power and/or communication signals to and/or from the water-intake device 14. Various valves and pumps for controlling the intake and outlet of water into and from the water-intake device 14 are not shown. Said intake and outlet can be controlled by means of a control unit, not shown, placed on the platform 5 and/or at the water-intake device 14 on the sea floor.

In the water-intake device 14, the untreated sea water is further supplied with chlorous water from a container 13, which adds chlorine from a liquid state to the injection water. In the exemplary embodiment shown, the container 13 is arranged as a refillable, volumetric, flexible storage tank as described in the Norwegian patent NO 331478. The container 13 is connected to the coupling device 51 of the platform 5 via a control cable 54. Valves and pumps, not shown, for dosing liquid chlorine into the sea water in the water-intake device 14 may thereby be controlled by means of a control unit not shown. The control unit, not shown, may be on the platform 5 and/or on the sea floor together with the container 13. The container 13 is further provided with a valve, not shown, for refilling chlorine from an external source not shown, as described in said Norwegian patent NO 331478. Said valves of the container 13 may further have been placed in signal communication with a sensor, not shown, for measuring the chlorine content of the water, so that a desired amount of chlorine may be maintained in the water.

The chlorinated water is further carried through a supply line 18 into an apparatus 12 for the gravitational precipitation of particles. The apparatus 12 is shown in the form of a container which is known from the patent publication WO 2007/035106 A1. The chlorinated sea water is carried into the container 12 via an inlet, not shown, and is allowed to flow slowly towards an outlet, not shown, of the container 12. The flow rate in the container 12 is sufficiently low for particles of a greater specific weight than water to settle onto the bottom of the container 12. According to the prior art, it has been difficult to precipitate biological material in such a container 12 because of the biological material basically having a specific gravity which is of the same order as that of the sea water which is to be cleaned. According to the present disclosure, the sea water is chlorinated upstream of the container 12, whereby the cell structure of the biological material in the water collapses and the specific gravity of the biological material increases. Thereby the gravitational precipitation of biological material becomes far more effective. The time it takes from when the water is carried into said inlet of the container 12 until it leaves the container 12 from said outlet may generally be in the order of 30 minutes and up to one hour and, in some embodiments, up to several hours. The container 12 for the gravitational precipitation of particles is connected to the platform 5 via a control cable 55. Electric power and communication signals transferred via the control cable 55 may be used for controlling valves and pumps, not shown, connected to the container 12 for the gravitational precipitation of particles by means of a control unit not shown. The control unit may be the same as that mentioned above, or it may be a separate control unit.

From the container 12 for the gravitational precipitation of particles, the water is carried through the supply line 18 to a high-pressure injection pump 31 and further into an injection well 3. The injection pump 31 is connected to the coupling device 51 of the platform 5 via a control cable 57, and the injection pump 31 may be controlled by means of a control unit not shown.

Figure 2:
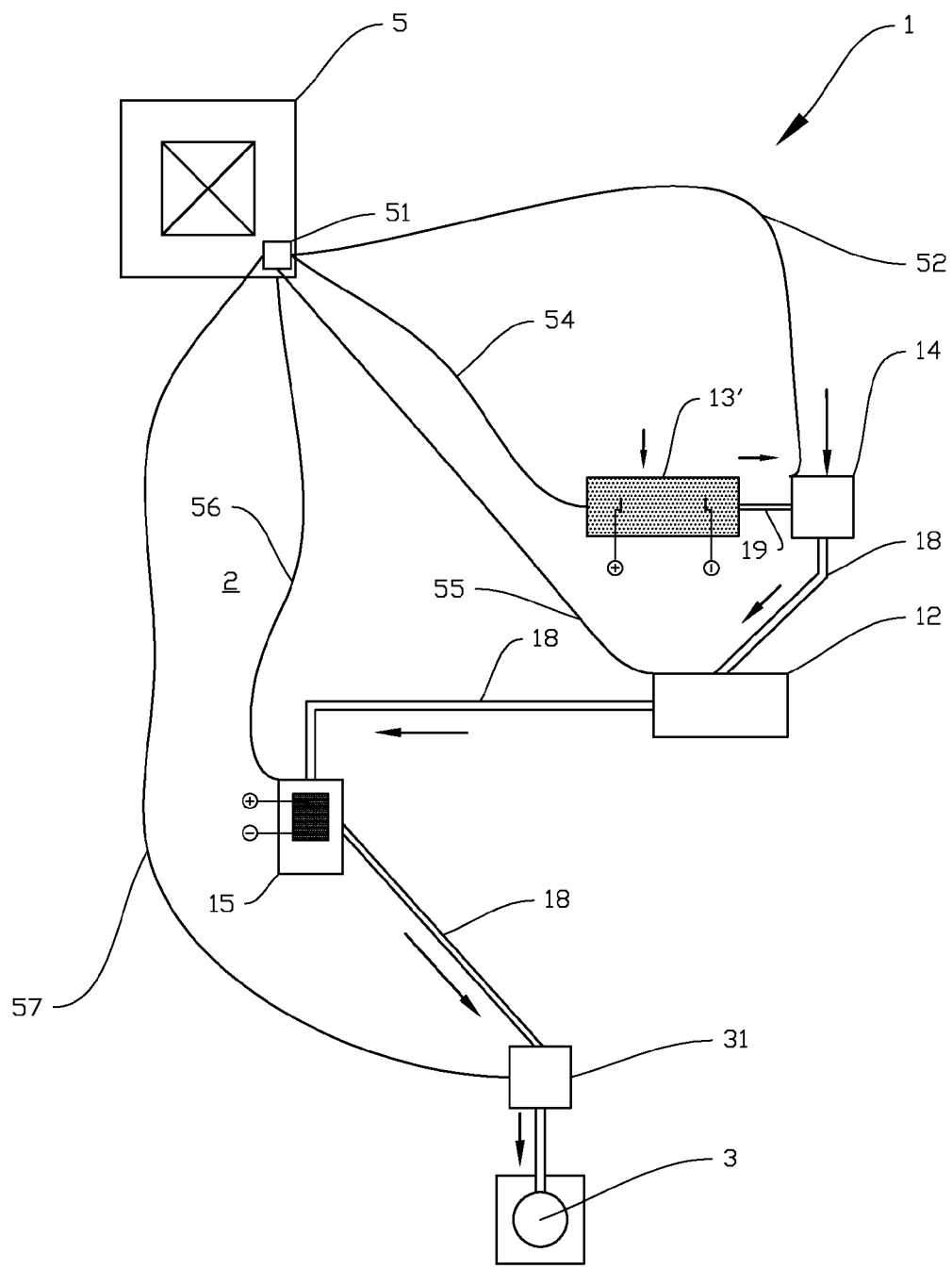

FIG. 2 shows an alternative embodiment of the present disclosure. An apparatus 13' for the addition of chlorine to the injection water is provided as an electrolytic cell, hereinafter referred to as a chlorine cell 13'. The chlorine cell 13' is connected to the coupling device 51 of the platform 5 via the control cable 54. The amount of sea water carried into and out of the chlorine cell 13' can thereby be controlled by means of valves and pumps, not shown. Chlorous water is carried from the chlorine cell 13' via a dosage line 19 into the water-intake device 14 in the same way as that mentioned above.

Downstream of the apparatus 12 for the gravitational precipitation of particles, the system 1 in the embodiment shown in FIG. 2 is further provided with an apparatus 15 for the electrolytic production of free hydroxyl radicals, referred to, in what follows, as the hydroxyl cell 15. The hydroxyl cell 15 is connected to the coupling device 51 of the platform 5 via a control cable 56, whereby the amount of water entering and exiting the hydroxyl cell 15 via the supply line 18 may be controlled by means of valves and pumps, not shown, connected to a control unit not shown. The cleaned water is carried onwards to the injection pump 31 and into the injection well 3.

Figure 3:
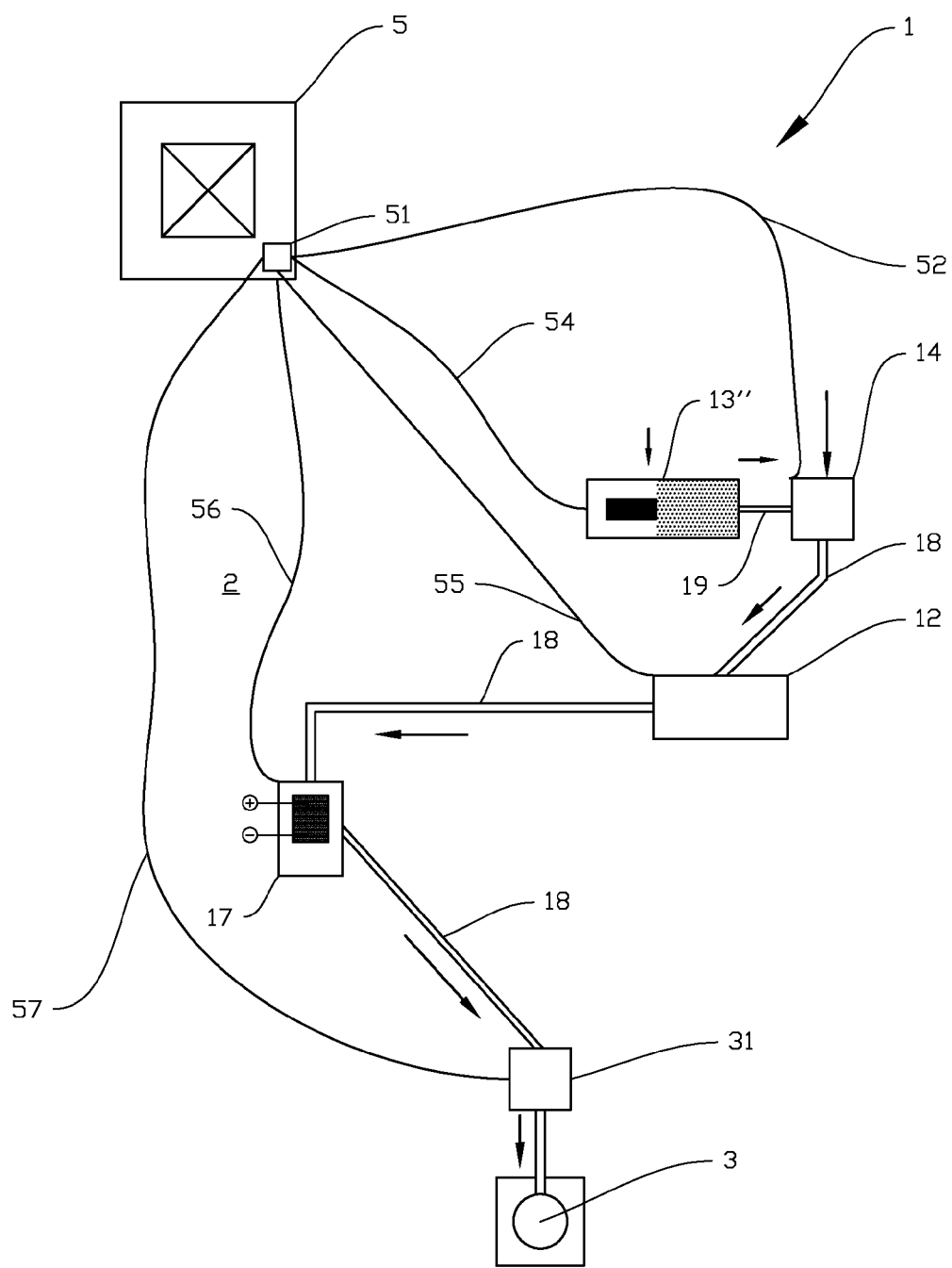

In FIG. 3, yet another alternative embodiment of the present disclosure is shown. Here, an apparatus 13" for the addition of chlorine to the injection water is provided as a container 13" for dosing chlorine from a solid or semisolid state. Untreated sea water is carried into the container 13" so that the sea water gets into contact with chlorine in a solid or semisolid state, whereby chlorine is dosed gradually into the injection water. The apparatus 13" for dosing chlorine from a solid or semisolid state into the injection water is connected to the coupling device 51 of the platform 5 via the control cable 54 in the same way as that mentioned above. Pumps and valves, not shown, may be controlled by a control unit not shown.

Downstream of the apparatus 12 for the gravitational precipitation of particles from the injection water, the system 1 in the embodiment shown in FIG. 3 is provided with an apparatus 17 for the electrolytic production of mixed oxidants, referred to, in what follows, as the oxidant cell 17. The oxidant cell 17 is connected to the coupling device 51 of the platform 5 via the control cable 56, and the amount of water entering and exiting the oxidant cell 17 may thereby be controlled in a manner corresponding to that described above.

Figure 4:
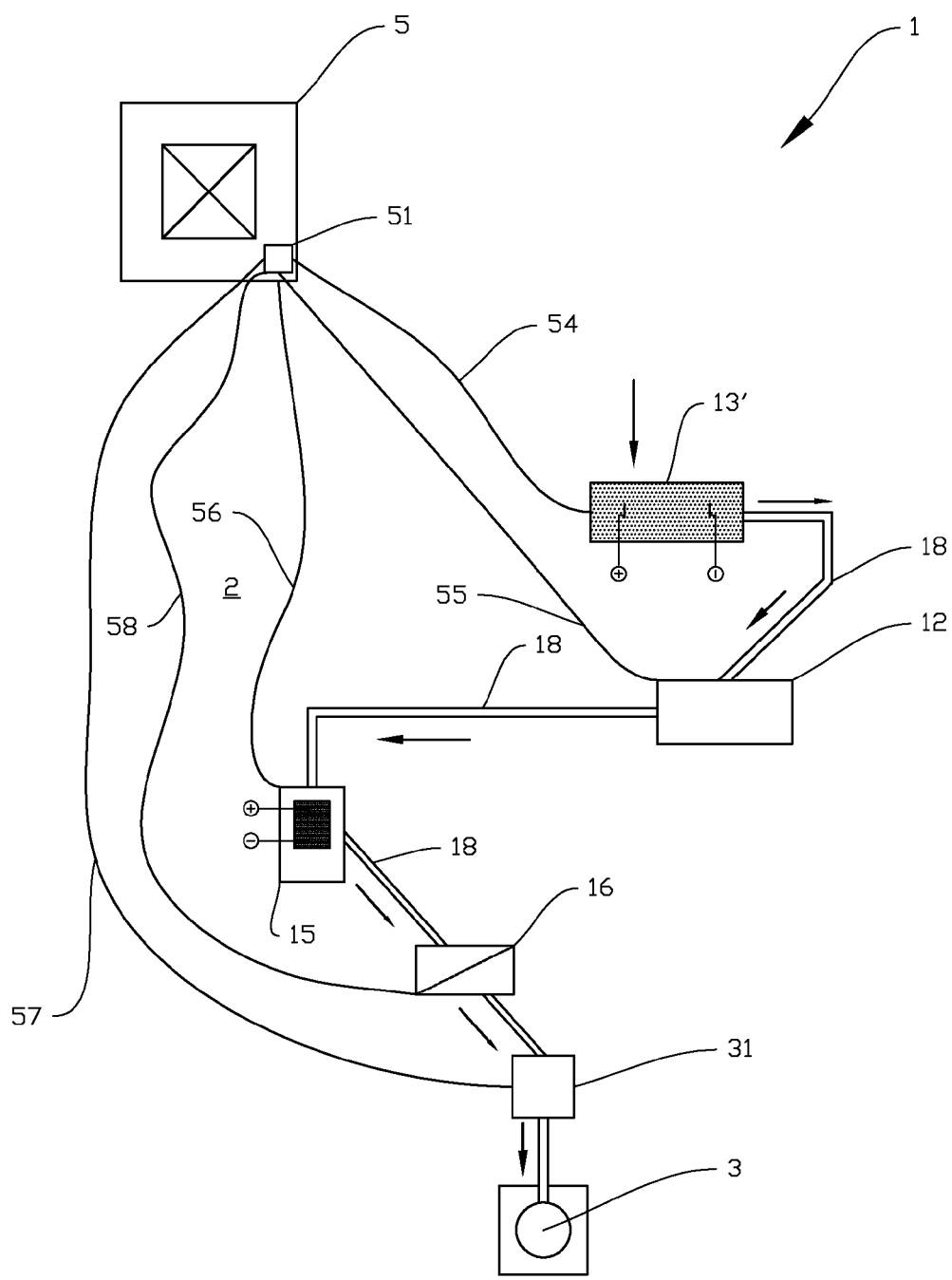

FIG. 4 shows a further embodiment of the present disclosure. The entire stream of injection water is carried directly into a chlorine cell 13'''. The chlorinated water is carried onwards to the apparatus 12 for the gravitational precipitation of particles. By means of sensors not shown, it will be possible to keep control of the chlorine content of the water at both the inlet and the outlet of the apparatus 12 for the gravitational precipitation of particles. The amount of chlorine that is dosed into the injection water may thus be small enough for all the chlorine to have time to react completely. The injection water downstream of the apparatus 12 for the gravitational precipitation of particles will thereby be free of chlorine. The hydroxyl cell 15 will be able to eliminate what might be left of biological material in the injection water flow in case the amount of added chlorine should be too small. In the embodiment shown, the system is further provided with apparatus 16 provided with a filtering membrane for removing any remaining particles of different salts and minerals in the injection water flow. The filtering membrane, which would have been damaged by chlorous water, may be of a type as described in the Norwegian patent application NO 20101192.

It will be understood that apparatuses included in the various embodiments may be combined into further embodiments not shown.

The different control cables 52, 54, 55, 56, 57, 58 are arranged to transfer electric power and/or communication signals to the above-mentioned different apparatuses connected to the system 1. Control units, not shown, for controlling said valves and pumps, not shown, connected to the different apparatuses may be placed on the platform and/or on the sea floor at the different apparatuses. The control cables 52, 54, 55, 56, 57, 58 may be arranged for two-way communication, so that information on the state of the system 1 may also be fed back to the platform 5.

The system 1 may be provided with a great number of couplings, valves, pumps, sensors and so on, which will be known to a person skilled in the art, therefore variations of the above embodiments will be apparent to the skilled person. Embodiments of the present disclosure have been described with particular reference to the examples illustrated. While specific examples are shown in the drawings and are herein described in detail, it should be understood, however, that the drawings and detailed description are not intended to limit the disclosure to the particular form disclosed. It will be appreciated that variations and modifications may be made to the examples described within the scope of the present disclosure.

What is claimed is:

1. A system for removing biological material from untreated water for subsequent injection into an injection well under a body of water, the system comprising:
   a first apparatus configured to add an oxidant to the untreated water to form a treated water, wherein the oxidant is an oxidizing biocide selected from chlorine, dioxygen, ozone, hydrogen peroxide, hypochlorite, chlorine dioxide, or a combination thereof; and
   a second apparatus configured to gravitationally precipitate the biological material from the treated water, wherein the second apparatus is configured to gravitationally precipitate the biological material by flowing the treated water within a closed space from a lower height to a higher height at a climbing speed that is less than a rate of precipitation of the biological material from the treated water,
   wherein the second apparatus is fluidly connected to and positioned downstream relative to the first apparatus,
   wherein the first apparatus is fluidly connected to a source of the untreated water for subsequent injection into the injection well, and
   wherein the second apparatus is fluidly connected to the injection well under the body of water.

2. The system of claim 1, wherein the oxidant comprises chlorine.

3. The system of claim 2, wherein the first apparatus is configured to add the chlorine in a solid or semisolid state.

4. The system of claim 2 or 3, wherein the first apparatus includes an electrolytic cell that electrolytically produces the chlorine from sea water.

5. The system of claim 2, wherein the first apparatus is configured to add the chlorine from a liquid state.

6. The system of claim 2, wherein the system further comprises a hydroxyl cell that electrolytically produces free hydroxyl radicals, wherein the hydroxyl cell is fluidly connected to the second apparatus, the first apparatus, and to the injection well.

7. The system of claim 2, wherein the system further comprises a mixed oxidant cell that electrolytically produces mixed oxidants, wherein the mixed oxidant cell is fluidly connected to the second apparatus, to the first apparatus and to the injection well.

8. A method of removing biological material from untreated water to be injected into an injection well located under a body of water, the method comprising:

(a) adding an oxidant to the untreated water comprising said biological material to form a treated water comprising a treated biological material, wherein the oxidant is an oxidizing biocide selected from chlorine, dioxygen, ozone, hydrogen peroxide, hypochlorite, chlorine dioxide, or a combination thereof to decompose a cell structure of the biological material and thus increase a specific gravity thereof, such that the treated biological material has the increased specific gravity relative to the specific gravity of the biological material in the untreated water;

(b) after (a), gravitationally precipitating the treated biological material with the increased specific gravity in the treated water by flowing the treated water within a closed space from a lower height to a higher height at a climbing speed less than a rate precipitation of the treated biological material; and (c) after (b), injecting said clean water into an injection well located under the body of water.

9. The method of claim 8, wherein adding said oxidant comprises adding chlorine.

10. The method of claim 9, wherein adding chlorine, includes adding chlorine from a solid or semisolid state.

11. The method of claim 9 or 10, wherein adding chlorine comprises producing chlorine by means of an electrolytic cell.

12. The method of claim 9, wherein adding chlorine comprises adding chlorine from a liquid state.

13. The method of claim 8, further comprising providing the system with a hydroxyl cell that electrolytically produces free hydroxyl radicals, and fluidly connecting the hydroxyl cell to the first apparatus to the second apparatus, to a source of the untreated water, and to the injection well.

14. The method of claim 8, wherein the method further includes providing the system with a mixed oxidant cell that electrolytically produces mixed oxidants and fluidly connecting the mixed oxidant cell to the first apparatus, the second apparatus, a source of the untreated water, and the injection well.

15. A system for removing biological material from untreated water for subsequent injection into an injection well under a body of water, the system comprising:

an oxidant injection device fluidly connected to a source of the untreated water, wherein the oxidant injection device is configured to add an oxidant to the untreated water to form a treated water, wherein the oxidant is an oxidizing biocide selected from chlorine, dioxygen, ozone, hydrogen peroxide, hypochlorite, chlorine dioxide, or a combination thereof, wherein the oxidant injection device comprises (i) a container holding the oxidant in a liquid, solid, or semisolid state, or (ii) an electrolytic cell; and a precipitation container configured to gravitationally precipitate the biological material from the treated water, wherein the container includes an enclosed space and an inlet to the enclosed space proximal a lower end of the enclosed space, wherein an outlet is disposed within the enclosed space vertically above the inlet, wherein the container is configured to gravitationally precipitate the biological material by flowing the treated water through the inlet and upward within the enclosed space to the outlet at a climbing speed that is less than a rate of precipitation of the biological material from the treated water;

wherein the container is fluidly connected to and positioned downstream of the oxidant injection device, and wherein the container is fluidly connected to the injection well under the body of water.

16. The system of claim 15, further comprising a hydroxyl cell configured to electrolytically produce free hydroxyl radicals, wherein the hydroxyl cell is fluidly connected to the precipitation container, the oxidant injection device, and to the injection well.

* * * * *